United States Patent
Bitter et al.

(10) Patent No.: US 7,574,024 B2
(45) Date of Patent: Aug. 11, 2009

(54) CENTERLINE AND TREE BRANCH SKELETON DETERMINATION FOR VIRTUAL OBJECTS

(75) Inventors: Ingmar Bitter, Maple (CA); Ming Wan, Sammamish, WA (US); Arie E. Kaufman, Plainview, NY (US); Frank Dachille, Mountain View, CA (US); Kevin Kreeger, Port Jefferson, NY (US); Zhengrong Liang, Stony Brook, NY (US); Mark R. Wax, Greenlawn, NY (US)

(73) Assignee: The Research Foundation of State University of New York, Stony Brook, NY (US)

( * ) Notice: Subject to any disclaimer, the term of this patent is extended or adjusted under 35 U.S.C. 154(b) by 659 days.

(21) Appl. No.: 10/380,211

(22) PCT Filed: Oct. 2, 2001

(86) PCT No.: PCT/US01/30858

§ 371 (c)(1),
(2), (4) Date: Feb. 2, 2004

(87) PCT Pub. No.: WO02/29717

PCT Pub. Date: Apr. 11, 2002

(65) Prior Publication Data

US 2004/0109603 A1    Jun. 10, 2004

(51) Int. Cl.
*G06K 9/00* (2006.01)
(52) U.S. Cl. .................................. 382/128; 382/154
(58) Field of Classification Search ................. 382/128, 382/154
See application file for complete search history.

(56) References Cited

U.S. PATENT DOCUMENTS

| 4,367,216 A | 1/1983 | Mutzel et al. |
| 4,391,280 A | 7/1983 | Miller |

(Continued)

FOREIGN PATENT DOCUMENTS

| WO | 9613207 | 5/1996 |

(Continued)

OTHER PUBLICATIONS

Hong et al., "3D Virtual Colonoscopy," 1995 Biomedical Visualization Proceedings, pp. 26-32 and 83 (1995).

(Continued)

*Primary Examiner*—Tom Y Lu
(74) *Attorney, Agent, or Firm*—Dorsey & Whitney LLP (57) ABSTRACT

In accordance with the present invention, a method for determining a centerline through a region of interest in a 3D image dataset is provided. The method includes identifying the boundaries of the region of interest and identifying the endpoints of the region of interest. For those points within the boundaries, a penalty value which is a function of the proximity of the point to a boundary is determined. A centerline is then identified by the path connecting the endpoints which has the minimum penalized distance wherein the penalized distance reflects the actual accumulated pathlength and the penalties associated with the points along the path. From the centerline, branches of a complete skeleton can be established by determining branch endpoints and then finding the minimum penalized distance from each endpoint the centerline or another intersecting branch.

11 Claims, 9 Drawing Sheets

U.S. PATENT DOCUMENTS

| | | | |
|---|---|---|---|
| 4,630,203 | A | 12/1986 | Szirtes |
| 4,710,876 | A | 12/1987 | Cline et al. |
| 4,719,585 | A | 1/1988 | Cline et al. |
| 4,729,098 | A | 3/1988 | Cline et al. |
| 4,737,921 | A | 4/1988 | Goldwasser et al. |
| 4,751,643 | A | 6/1988 | Lorensen et al. |
| 4,791,567 | A | 12/1988 | Cline et al. |
| 4,823,129 | A | 4/1989 | Nelson |
| 4,831,528 | A | 5/1989 | Crawford et al. |
| 4,874,362 | A | 10/1989 | Wiest et al. |
| 4,879,668 | A | 11/1989 | Cline et al. |
| 4,984,157 | A | 1/1991 | Cline et al. |
| 4,985,834 | A | 1/1991 | Cline et al. |
| 4,985,856 | A | 1/1991 | Kaufman |
| 4,987,554 | A | 1/1991 | Kaufman |
| 4,993,415 | A | 2/1991 | Long |
| 5,006,109 | A | 4/1991 | Douglas et al. |
| 5,023,072 | A | 6/1991 | Cheng |
| 5,038,302 | A | 8/1991 | Kaufman |
| 5,047,772 | A | 9/1991 | Ribner |
| 5,056,020 | A | 10/1991 | Feldman et al. |
| 5,095,521 | A | 3/1992 | Trousset et al. |
| 5,101,475 | A | 3/1992 | Kaufman |
| 5,127,037 | A | 6/1992 | Bynum |
| 5,166,876 | A | 11/1992 | Cline et al. |
| 5,170,347 | A | 12/1992 | Tuy et al. |
| 5,187,658 | A | 2/1993 | Cline et al. |
| 5,204,625 | A | 4/1993 | Cline et al. |
| 5,229,935 | A | 7/1993 | Yamagishi et al. |
| 5,245,538 | A | 9/1993 | Lis |
| 5,261,404 | A | 11/1993 | Mick et al. |
| 5,265,012 | A | 11/1993 | Amans et al. |
| 5,270,926 | A | 12/1993 | Tam |
| 5,283,837 | A | 2/1994 | Wood |
| 5,295,488 | A | 3/1994 | Lloyd et al. |
| 5,299,288 | A | 3/1994 | Glassman et al. |
| 5,322,070 | A | 6/1994 | Goodman et al. |
| 5,345,490 | A | 9/1994 | Finnigan et al. |
| 5,361,763 | A | 11/1994 | Kao et al. |
| 5,365,927 | A | 11/1994 | Roemer et al. |
| 5,371,778 | A | 12/1994 | Yanof et al. |
| 5,442,733 | A | 8/1995 | Kaufman et al. |
| 5,458,111 | A | 10/1995 | Coin |
| 5,611,025 | A | 3/1997 | Lorensen et al. |
| 5,623,586 | A | 4/1997 | Höhne |
| 5,630,034 | A | 5/1997 | Oikawa et al. |
| 5,699,799 | A | 12/1997 | Xu et al. |
| 5,734,384 | A | 3/1998 | Yanof et al. |
| 5,782,762 | A | 7/1998 | Vining |
| 5,971,767 | A | 10/1999 | Kaufman |
| 5,986,662 | A | 11/1999 | Argiro et al. |
| 6,130,671 | A | 10/2000 | Argiro |
| 6,219,059 | B1 | 4/2001 | Argiro |
| 6,272,366 | B1 | 8/2001 | Vining |

FOREIGN PATENT DOCUMENTS

| | | |
|---|---|---|
| WO | 9811524 | 3/1998 |
| WO | 9837517 | 8/1998 |
| WO | 0055812 | 9/2000 |
| WO | 0055814 | 9/2000 |

OTHER PUBLICATIONS

Hong et al., "3D Reconstruction and Visualization of the Inner Surface of the Colon from Spiral CT Data," IEEE, pp. 1506-1510 (1997).
William E. Lorensen, "The Exploration of Cross-Sectional Data with a Virtual Endoscope," Interactive Technology and the New Health Paradigm, IOS Press, pp. 221-230 (1995).
Adam L. Penenberg, "From Stony Brook, a New Way to Examine Colons, Externally," The New York Times, p. 6 (1996).
David J. Vining, "Virtual Colonoscopy," Advance for Administration in Radiology, pp. 50-52 (1998).
Zhou et al., "Three-Dimensional Skeleton and Centerline Generation Based on an Approximate Minimum Distance Field," The Visual Computer, 14:303-314 (1998).
Liang Z et al., "Inclusion of priori information in segmentation of colon lumen for 3D virtual colonoscopy", 1997 IEEE Nuclear Science Symposium Conference Record, pp. 1423-1427, vol. 2.
Valev et al., "Techniques of CT colongraphy (virtual colonscopy)", Critical Reviews in Biomedical Engineering, 1999, Begall House, vol. 27, No. 1-2, pp. 1-25.
Shibolet O et al., "Coloring voxel-based objects for virtual endoscopy", IEEE Symposium on Volume Visualization, Research Triangle, Oct. 1998.
Kaufman A., Wan M., "Disobstruction of Colon Wall Collapse", Project Description, online www.cs.sunysb.edu, Jan. 1999.
Holzapfel G A, et al., "Large strain analysis of soft biological membranes: formulation and finite element analysis", Computer Methods in Applied Mechanics and Engineering, vol. 132, No. 1-2, pp. 45-61, 1996.
Kaye J. et al., "A 3D virtual environment for modeling mechanical cardiopulmonary interactings", CVRMED-MRCAS '97, pp. 389-398, 1997.
Burgard W. et al., "Active mobile robot localization by entrophy minimization", Proceedings second euromicro workshop on advanced mobile robots, pp. 155-162, 1997.
Suya You et al., "Interactive volume rendering for virtual colonoscopy", Proceedings Visualization '97, pp. 433-436, 571.
Pai D.K. et al., "Multiresolution Rough Terrain Motion Planning", IEEE Transactions on Robotics and Automatic, vol. 14, No. 1, pp. 19-33, 1998.
Hagen H. et al., "Methods for Surface Interrogation", Proceedings of the Conference on Visualization, vol. CONF 1, pp. 187-193, 1990.
Chen et al., "A tree-branch searching, multiresolution approach to skeletonization for virtual endoscopy".
Liang Z. et al., "Feasibility Studies on Extracting Bladder Wall from MR Images for Virtual Cystoscopy".
Chen et al., "Virtual Laryngoscopy: Feasibility Studies by CT and MRI", IEEE Medical Imaging Conference, Nov. 1999.
Chen et al., A multi-scan MRI-based virtual cystoscopy.
Chen et al., "MRI-Based Virtual Cystoscopy: The image segmentation and visualization", SPIE Conference, Feb. 12-18, 2000.
Chen et al., "A Fast Algorithm to Generate Centerline for Virtual Colonscopy", SPIE Conference, Feb. 12-18, 2000.
Richard Robb, "Virtual (Computed) Endoscopy: Development and Evaluation Using the Visible Human Datasets", Oct. 7-8, 1996. www.mayo.edu.
I. Bitter et al., "Penalized-Distance Volumetric Skeleton Algorithm", IEEE Transactions on Visualization and Computer Graphics, vol. 7, No. 3, Jul.-Sep. 2001, pp. 195-206.
M. Wan et al., "Distance-Field Based Skeletons for Virtual Navigation", *Visualization 2001*, San Diego, CA, Oct. 2001.
M. Sato et al., "An automatic colon segmentation for 3D virtual colonoscopy", IEICE Trans. Information and Systems, vol. E84-D, No. 1, Jan. 2001, pp. 201-208.
D. Chen et al., "A Novel Approach to Extract Colon Lumen from CT Images for Virtual Colonoscopy" IEEE Transactions on Medical Imaging, vol. 19, No. 12, Dec. 2000, pp. 1220-1226.
M. Wax et al., "Virtual Colonoscopy—CT Contrast Agent", Second International Symposium on Virtual Colonoscopy, Boston, MA, Oct. 2000.
K. Kreeger, et al., "Volume Rendering for Virtual Colonoscopy on an Affordable PC", Second International Symposium on Virtual Colonoscopy, Boston, MA, Oct. 2000.
S. Lakare et al., "3D Digital Cleansing Using Segmentation Rays", IEEE Visualization 2000 Conference Proceedings, ACM/SIGGRAPH Press, pp. 37-44, Oct. 2000.
S. Lakare et al., "Automated Pre-navigation processing for Virtual Colonoscopy", Second International Symposium on Virtual Colonoscopy, pp., Oct. 2000.
K. Kreeger et al., "Perspective Virtual Endoscopy with VolumePro Parallel Rendering", Center for Visual Computing and Department of Computer Science, pp. 1-8.

D. Chen et al. "A tree-branch searching, multi-resolution approach to skeletonization for virtual endoscopy", SPIE Medical Imaging 2000, Feb. 2000.

M. Wan et al., "3D Virtual Colonoscopy with Real-time Volume Rendering", SPIE Medical Imaging 2000, Feb. 2000.

M. Wax et al., "Advancing Virtural Colonoscopy to Practice", International Workshop on 3D Imaging and Virtual Endoscopy, Feb. 2000.

W. Li et al., "Virtual Colonoscopy Powered by VolumePro", pp. 1-13, month unavailable 1999.

M. Wan et al., "Volume Rendering Based Interactive Navigation within the Human Colon", IEEE Visualization '99 conference, San Francisco, CA, Oct. 1999, pp. 397-400.

R. Chiou et al., "Interactive Fly-Path Planning Using Potential Fields and Cell Decomposition for Virtual Endoscopy", IEEE Trans. Nuclear Sciences, vol. 46, No. 4, Aug. 1999, pp. 1045-1049.

D. Chen et al., "MR Imaging and Segmentation of the Colon Wall for Virtual Colonscopy", Soc. Magn. Reson. Medicine, vol. 3, pp. 2203.

R. Chiou et al., "Volume Segmentation and Rendering of Mixtures of Materials for Virtual Colonoscopy", SPIE Medical Imaging '99, Feb. 1999, pp. 133-138.

Z. Liang et al., "On Segmentation of Colon Lumen for Virtual Colonoscopy", SPIE Medical Imaging, Feb. 1999, pp. 270-278.

Z. Liang et al., "Virtual Endoscopy in Early Detection of Cancers", Biomedical Imaging Symposium: Visualizing the Future of Biology and Medicine, Washington, D.C., Feb. 1999.

R. Chiou et al., "Unified Analysis, Modeling, Matching and Synthesis for CT Color Texture Mapping from the Visible Human Dataset", The Second Visible Human Project Conf., Bethesda, MD, Oct. 1998.

M. Wan et al., "Boundary Cell-Based Acceleration for Volume Ray Casting", Computer & Graphices, vol. 22, No. 6, 1998, pp. 715-721.

R. Chiou et al., "Interactive Path Planning for Virtual Endoscopy", Conf. Record IEEE NSS-MIC, Nov. 1998.

M. Wax et al., "Electronic Colon Cleansing for Virtual Colonoscopy", Presentation at the first Int'l. Conf. on Virtual Colonoscopy, Boston, MA, Oct. 1998.

L. Hong et al., "Virtual Voyage: Interactive Navigation in the Human Colon", Proc. ACM SIGGRAPH '97, Aug. 1997, pp. 27-34.

A. Viswambharan et al., "Virtual Colonoscopy: Three-dimensional Reconstruction of the Mucosal Surface of the Colon", Conf. of Radiological Society of North America (RSNA), Dec. 1996, pp. 565 (Scientific Merit Award).

L. Hong et al., "Physcially-Based Interactive Navigation", Technical Report TR.96.01.09, Computer Science Department, SUNY at Stony Brook, Jan. 1996.

L. Hong et al., "Visible Human Virtual Colonoscopy", Conference of National Library of Medicine Visible Human Project, Oct. 1996, pp. 29-30.

$80^{th}$ Scientific Assembly and Annual Meeting Nov. 27-Dec. 2, 1994, Radiology Society of North America Founded in, InfoRAD Exhibits.

Taosong He, et al. "Collision Detection for Volumetric Objects", Proceedings of the $8^{th}$ IEEE Visualization Conference, 1997 1070-2385/97.

Yaoping Wang et al., "Real-Time Interactive Simulator for Percutaneous Coronary Revascularization Procedures", Computer Aided Surgery, 3:211-227, 1998.

U.S. Published Application 2002/0164061 to Paik et al.

U.S. Published Application 2001/0055016 A1 to Krishnar.

Pending application with common assignee and potentially related subject matter—U.S. Appl. No. 11/613,306.

Pending application with common assignee and potentially related subject matter—U.S. Appl. No. 10/182,217.

Pending application with common assignee and potentially related subject matter—U.S. Appl. No. 10/297,349.

Pending application with common assignee and potentially related subject matter—U.S. Appl. No. 11/613,283.

Pending application with common assignee and potentially related subject matter—U.S. Appl. No. 10/246,070.

Pending application with common assignee and potentially related subject matter—U.S. Appl. No. 10/246,015.

Pending application with common assignee and potentially related subject matter—U.S. Appl. No. 10/380,210.

NEIGHBOR EDGE: ⎯⎯⎯⎯
LOWEST COST PATH: ●⎯⎯●

FIG. 8A

PENALTY EDGE: ------
LOWEST COST PATH: •-●-•⎯•-●-•

CENTERLINE AND TREE BRANCH SKELETON DETERMINATION FOR VIRTUAL OBJECTS

STATEMENT REGARDING FEDERALLY SPONSORED RESEARCH

The subject matter of this application was funded in part by the National Institute of Health, contract number CA79180 and the U.S. Office of Naval Research, grant number N000149710402. From these grants, the U.S. government may have certain rights to the invention.

CROSS REFERENCE TO RELATED APPLICATIONS

The present application is a U.S. National Stage Entry of International Patent Application No. PCT/US01/30858 filed Oct. 2, 2001, the entire disclosure of which is incorporated herein by reference. The present application also claims priority from U.S. patent application Ser. No. 60/237,311 filed Oct. 2, 2000, the entire disclosure of which is also incorporated herein by reference.

FIELD OF THE INVENTION

The present invention relates generally to computer-based three dimensional visualization and more particularly relates to improved methods for virtual navigation including skeleton generation.

BACKGROUND OF THE INVENTION

In many computer-based visualization systems, it is desirable to be able to define a skeleton or centerline through the object being viewed. Such a skeleton provides a reference path for virtual navigation, such as in virtual colonoscopy. Similarly, accurate length measurements and navigation through other organs, such as the aorta, also require an object skeleton. Of course, the need to define an accurate centerline or tree is not limited to medical imaging. Other fields, such as virtual engineering and architecture would also benefit from accurate methods of defining a skeleton in tree like objects or generating a centerline in linear objects in various visualization applications.

Various techniques are known for generating a center line for an object being visualized. For example, in the virtual examination of organs, such as the colon, a centerline can be manually marked by the radiologist while reviewing image data, such as CT, MRI or ultrasound data. However, because of the high level of manual intervention involved in this technique, it is expensive and generally not preferred.

An automatic method of generating a centerline is referred to as topological thinning, or "onion peeling." While there are numerous known variants of this technique, in general, volume units (voxels) from a region of interest are removed layer by layer from the boundary until what remains is a connected line of predetermined thickness, such as one voxel. While this technique has generally proven effective at determining a centerline in objects such as the colon, it has the disadvantage of being computationally expensive. In addition, with certain geometry's, the centerline that is determined by topological thinning is not always the centerline which would be intuitively desired.

Figure 8A:
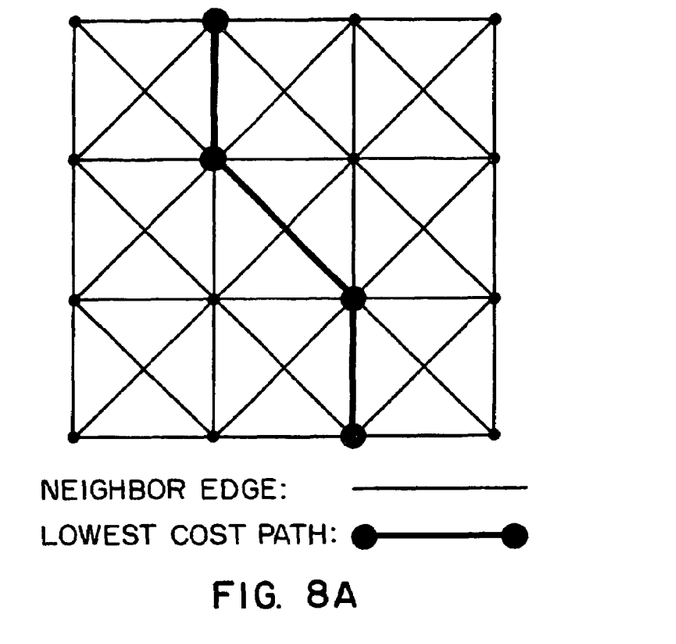

Other techniques for generating a centerline through a virtual object include the use algorithms which attempt to determine the shortest path through an object, such as the Dijkstra algorithm, which is disclosed in the article "A Note on Two Problems in Connexion with Graphs," Dijkstra, Numerishe Mathemetik, vol. 1, pp 269-271, 1959, which is hereby incorporated by reference in its entirety. The Dijkstra algorithm finds the global minimal weight path in a weighted graph with nonnegative weights. This algorithm generally includes two phases: first, a distance from a source field (DSF) is created by labeling all graph vertices with the shortest distance from a single source to those vertices. Second, the shortest path is determined by tracing back from the farthest node to the source node. Thus, use of this algorithm requires mapping the image data to a graph form. An example of such a mapping is illustrated in FIG. 8a. The Dijkstra algorithm has a draw back in the case of sharp turns occurring in the object. In such as case, the algorithm in seeking the shortest path tends to "hug the corner" and the centerline shifts from the center towards the boundary.

A skeleton of a virtual object can be defined in the context of a number of desired properties. As used herein, a skeleton should be tree-shaped and composed of single voxel paths through the branches. Thus, the skeleton represents a 1D curve in a 3D space rather than a 2D manifold. The skeleton should remain within the boundary of the region of interest and more preferably should remain in the "center" of the shape. For objects of arbitrary form, the concept of center may require a balancing between maximizing the distance from all of the boundaries of the boundaries of the region of interest and minimizing the extent that the centerline takes on a tortuous path. This balancing implies the desirability of applying a form of shortest path or union of shortest paths in deriving a skeleton.

Although a number of techniques are known for generating a skeleton of an object, each of the known techniques have inherent drawbacks. Thus, there remains a need for improved techniques for generating centerlines, skeletons and or navigation paths within virtual objects.

The centerline is often used as the primary path for navigating through a virtual object. For example, in the case of virtual colonoscopy, the user is generally allowed to navigate along the centerline of the colon in either direction and can navigate off the centerline to explore regions of interest. Thus, virtual colonoscopy can provide the viewer with a more flexible view of the inner luminal surface of the colon than can be achieved with conventional optical colonoscopy. This is accomplished due to the fact that virtual reality and computer graphics allow the virtual camera to view from any arbitrary viewpoint and with any arbitrary view-direction, while optical colonoscopy is limited to a path in one direction along the colon (due to the fact that the optical camera is placed at the end of a probe with limited mobility). However, with the flexibility that is provided by virtual examination comes a new challenge. Specifically, the difficulty in following orientation changes. The colon is a very tortuous organ, and, as a result, when following along the colon in 3D users can become disoriented. This risk is especially present when the user veers off the centerline and examines a structure close to the colon wall. Often times, when returning to the centerline, the user may head back in the direction they previously came from. Since the view is from the opposite direction, it is usually not readily apparent that the flight is headed in the reverse direction. Thus it would be desirable to provide a method of reducing the opportunity for a viewer to become disoriented while navigating through the virtual object without reducing the desirable flexibility which can be achieved in the virtual environment.

SUMMARY OF THE INVENTION

It is an object of the present invention to provide an improved method for generating a centerline, and where applicable a skeleton, of a virtual object.

In accordance with the present invention, a method for determining a centerline through a region of interest in a 3D image dataset is provided. The method includes identifying the boundaries of the region of interest and identifying the endpoints of the region of interest. For those points within the boundaries, a penalty value which is proportional to proximity of the point to a boundary is determined. A centerline is then identified by the longest Euclidean path connecting the endpoints which has the minimum penalized distance wherein the penalized distance reflects the actual accumulated pathlength and the penalties associated with the points along the path.

The method preferably includes steps to initially identify points which are near the centerline of the object. In this case, the steps of determining a penalty value and determining a path described above can be performed only on those points which are near the centerline. This reduces the dataset which is to be processed thereby improving processing cost and speed.

The operation of identifying points near the centerline can be accomplished by: computing a distance from boundary field (DBF) for each of the points in the region of interest; determining a gradient field for each point in the region of interest; identifying regions of points having a non-uniform gradient; and connecting the regions having a non-uniform gradient.

In addition to a single centerline, it is also desirable to extend the method to determine a complete skeleton of a branched object. This can be performed by identifying the endpoints of the branches extending from the centerline, and for each identified endpoint, determining a branch path connecting the endpoint to another branch which has the minimum penalized distance. Again, the penalized distance for each branch reflects the actual accumulated pathlength of the branch and the penalties associated with the points along the branch path.

BRIEF DESCRIPTION OF THE DRAWING

Further objects, features and advantages of the invention will become apparent from the following detailed description taken in conjunction with the accompanying figures showing illustrative embodiments of the invention, in which

FIGS. 8a and 8b are a pictorial diagram illustrating a mapping of a voxel grid and neighbor relations to an undirected graph on which the Dijkstra algorithm can be applied, wherein FIG. 8a represents a conventional shortest distance source field and FIG. 8b represents a penalized distance from the source field, which is used in the present invention;

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

The present invention provides an improved and computationally efficient method of automatically generating a centerline in a lumen or a skeleton in a more complex object. The method uses the concept of penalized distance fields to augment known shortest path algorithms, such as the Dijkstra shortest path. The examples referred to are generally in the context of medical examination, such as virtual colonoscopy, but are applicable to any application of computer based virtual navigation.

Figure 8B:
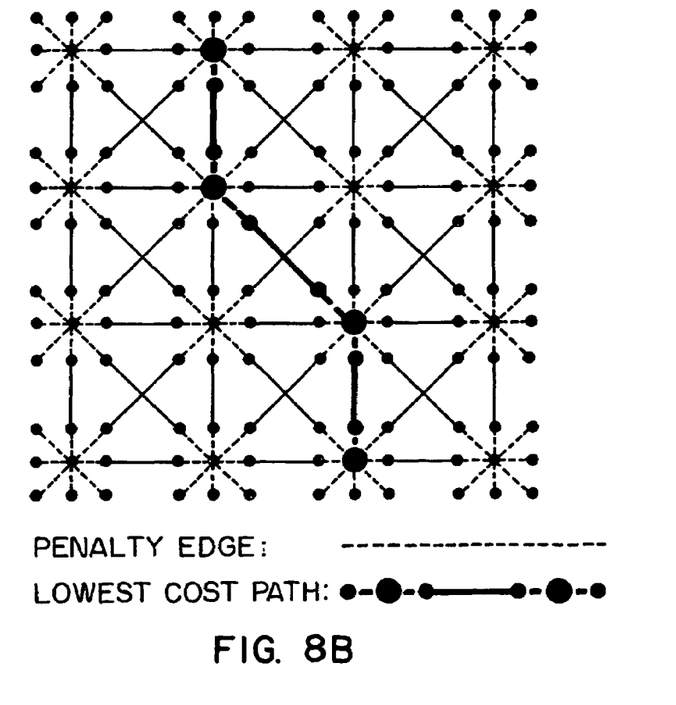

As noted above, a problem with the known Dijkstra shortest path algorithm is evident when the path through the object turns sharply. In such a case, without some form of embellishment or modification, the Dijkstra shortest path will tend to hug the corner and deviate from the center of the object. In the present methods, this is corrected by use of the notion of a penalty field. FIG. 8A illustrates a distance field connecting voxels in accordance with the conventional Dijkstra algorithm. Referring to FIG. 8B, the present method supplements the neighbor edges of the Dijkstra algorithm by adding "penalty edges" which are weighted to provide an increased weight or penalty for those voxels near the object boundary. In the representation of FIG. 8B, there are 27 vertices per voxel: one central vertex and 26 penalty vertices, that each share a penalty edge with the central vertex. The penalty edges have a weight equal to one half the penalty associated with including that voxel in the path. In this case, neighbor edges now connect to penalty vertices. This results in a graph that is a singly connected component where edges have positive weights to enable the Dijkstra algorithm to find the globally minimal shortest path. The cost associated with a path is the accumulated piecewise Euclidean distance of the path plus the sum of all of the penalties associated with the path. The centerline is defined as the minimum cost path through the penalized distance field.

Figure 1:
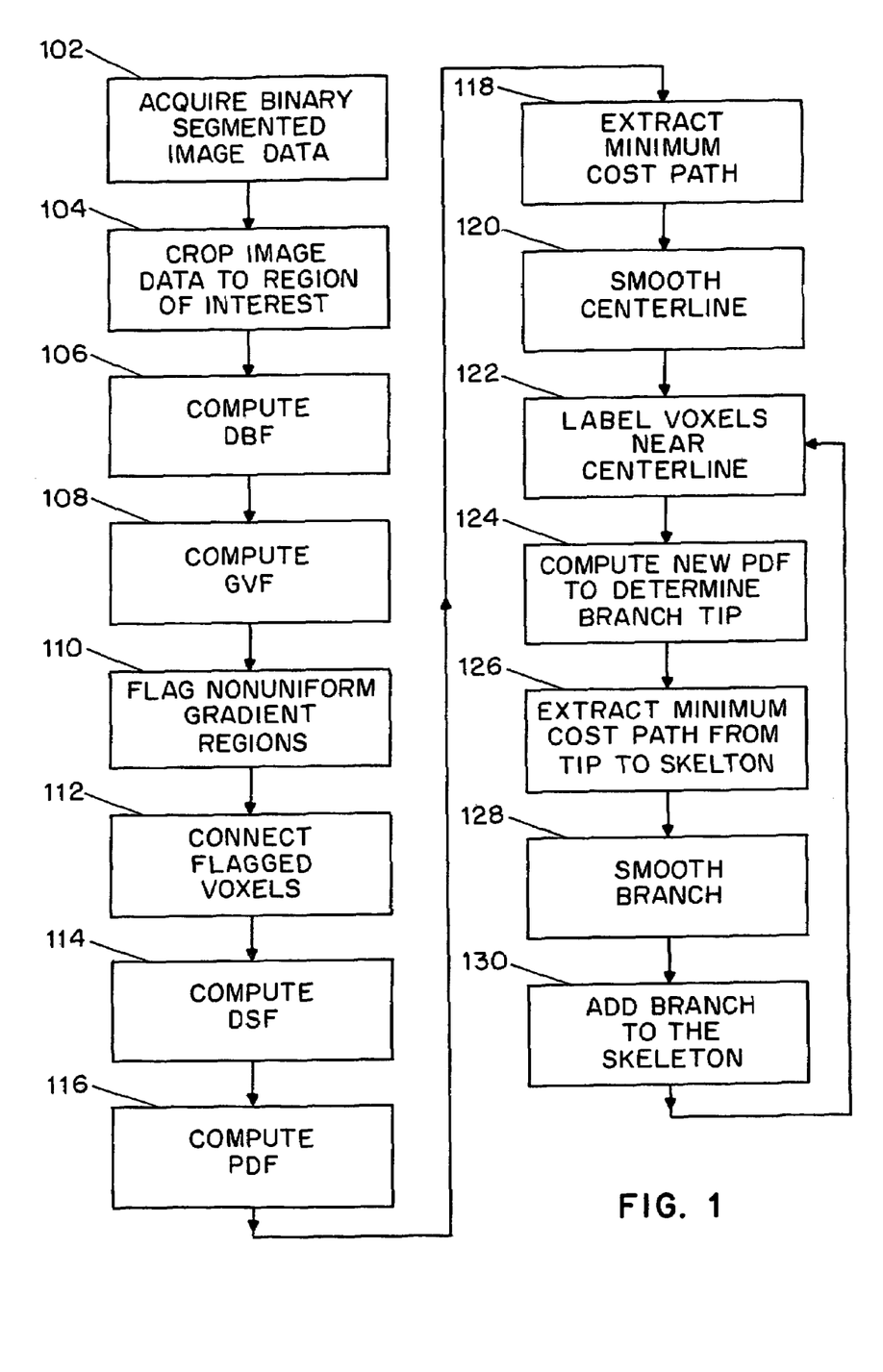
FIG. 1 is a flow chart illustrating a preferred method for generating a skeleton of a virtual object in accordance with the present invention.

FIG. 1 is a flow chart depicting an method for determining a skeleton of a virtual object. The method assumes that image data of an object has been acquired, such as CT or MRI data, and that this data has transformed into the 3D volume domain and has been segmented. Acquiring 2D image data, such as CT, MRI, ultrasound, and the like and transforming the 2D data into a 3D representation having a plurality of voxels is well known in the art, as are various techniques for segmenting such 3D data. The data is thus presented as a 3D rectilinear grid which can be referred to as the volume wherein each volumetric sample point is called a voxel.

For the purposes of determining the centerline, the segmented image data can be subjected to a binary mask which delineates the object boundary and labels those voxels within the volume of the boundary as "inside" voxels. (step 102). The segmentation techniques disclosed in connection with electronic colon cleansing in U.S. patent application Ser. No. 09/777,120, filed on Feb. 2, 2001 and entitled "System and Method for Performing a Three-Dimensional Virtual Examination of Objects, Such as Internal Organs," which is hereby incorporated by reference, can be used in this regard. With the boundary defined by the binary mask, the region of interest can be cropped using a bounding box which encloses those voxels tagged as "inside." (Step 104). While not essential to the practice of the invention, by cropping the data in step 104, a significant reduction in the data set is achieved and the subsequent steps are rendered more efficient. For example, in the case of medical imaging scans, the volume size is reduced on the order of 30-50%.

Figure 2:
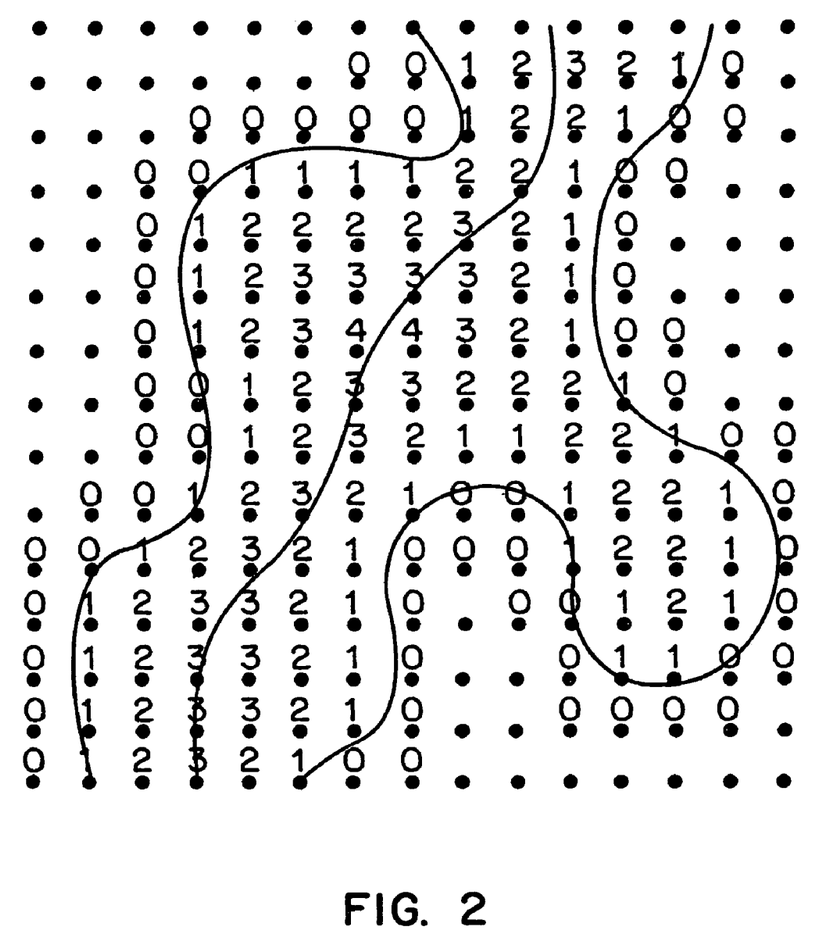
FIG. 2 is a graphical representation of an outline of a region of interest along with a numerical representation of the Euclidean distance between each inside voxel and the object boundary or distance from boundary field (DBF)

Following cropping, the Euclidean distance between each voxel flagged as "inside" the volume and the boundary is determined and recorded. (Step 106). As illustrated in FIG. 2, this results in a mapping of the distance from boundary field (DBF). One method of determining the Euclidean distance is a four pass algorithm disclosed in the article "New Algorithms for Euclidean Distance Transformation of an n-Dimensional Digitized Picture with Applications," T. Saito et al., Pattern Recognition, vol. 27, no. 11, pp. 1551-1565. However, other algorithms for calculating the distance from the respective voxels to the boundaries can also be employed.

Figure 3:
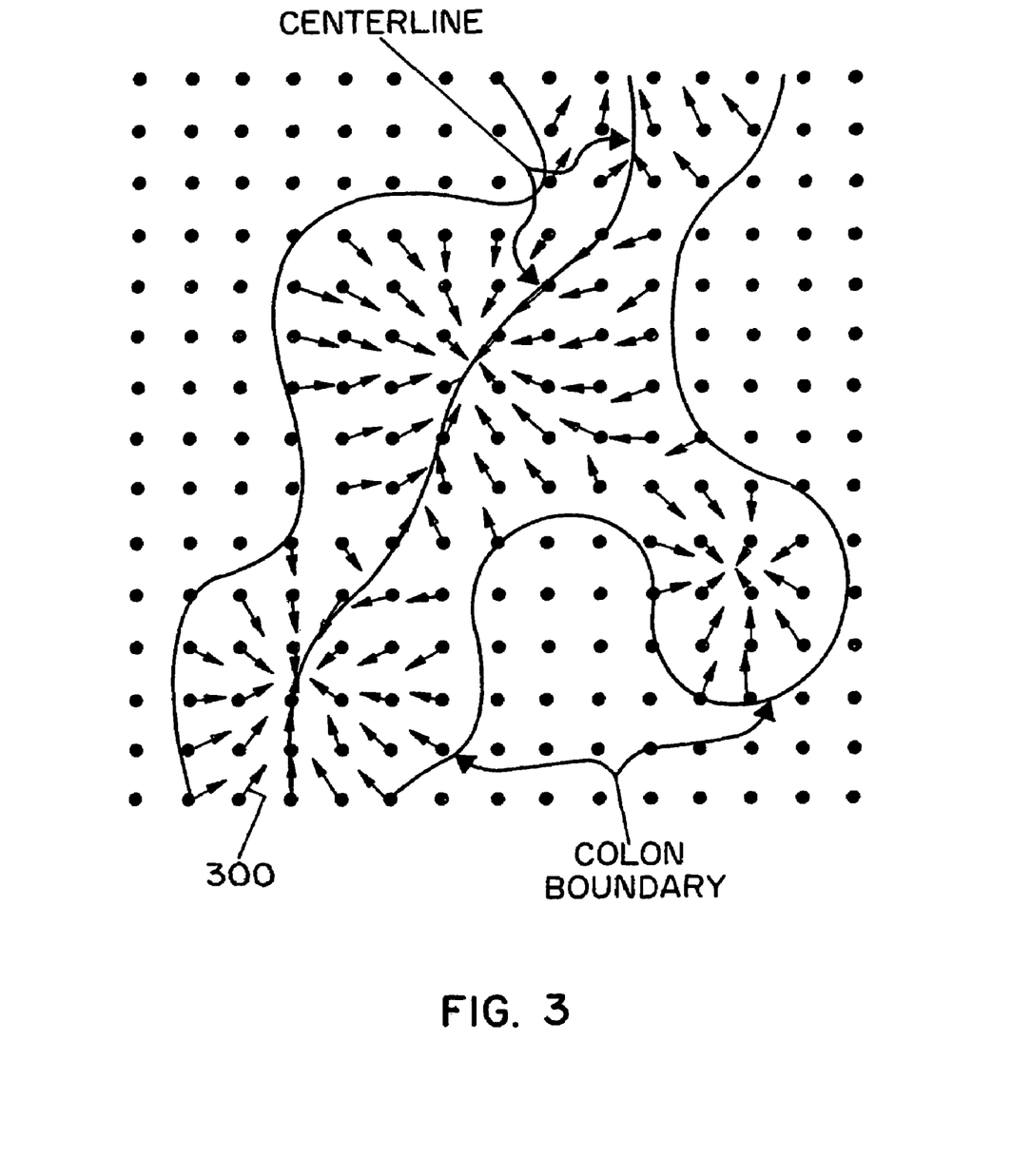
FIG. 3 is a graphical representation of gradient field vectors for voxels in a region of interest.

Preferably, for each voxel within the boundary of the region of interest, a central difference gradient is calculated to define a gradient vector field (GVF) of the distance from boundary fields (DBF). (Step 108). This can be achieved by comparing each voxel with only six neighboring voxels. The GVF at point (x,y,z) is found by $G_{xyz}=(G_x,G_y,G_z)$ where $G_x=V_{x+1,y,z}-V_{x-1,y,z}$ and $G_y=V_{x,y+1,z}-V_{x,y-1,z}$ and $G_z=V_{x,y,z+1}-V_{x,y,z-1}$. Higher numbers of neighboring voxels can be used in this calculation, such as by using a 26-voxel neighborhood Sobel filter, however increasing the number of voxels tends to slow the calculation without improving the resulting centerline. The graphical representation of FIG. 3 illustrates a GVF for the representation of the DBF of FIG. 2. In FIG. 3, each gradient vector field vector associated with a respective voxel is illustrated as an arrow 300 with its origin at the voxel position.

Figure 4:
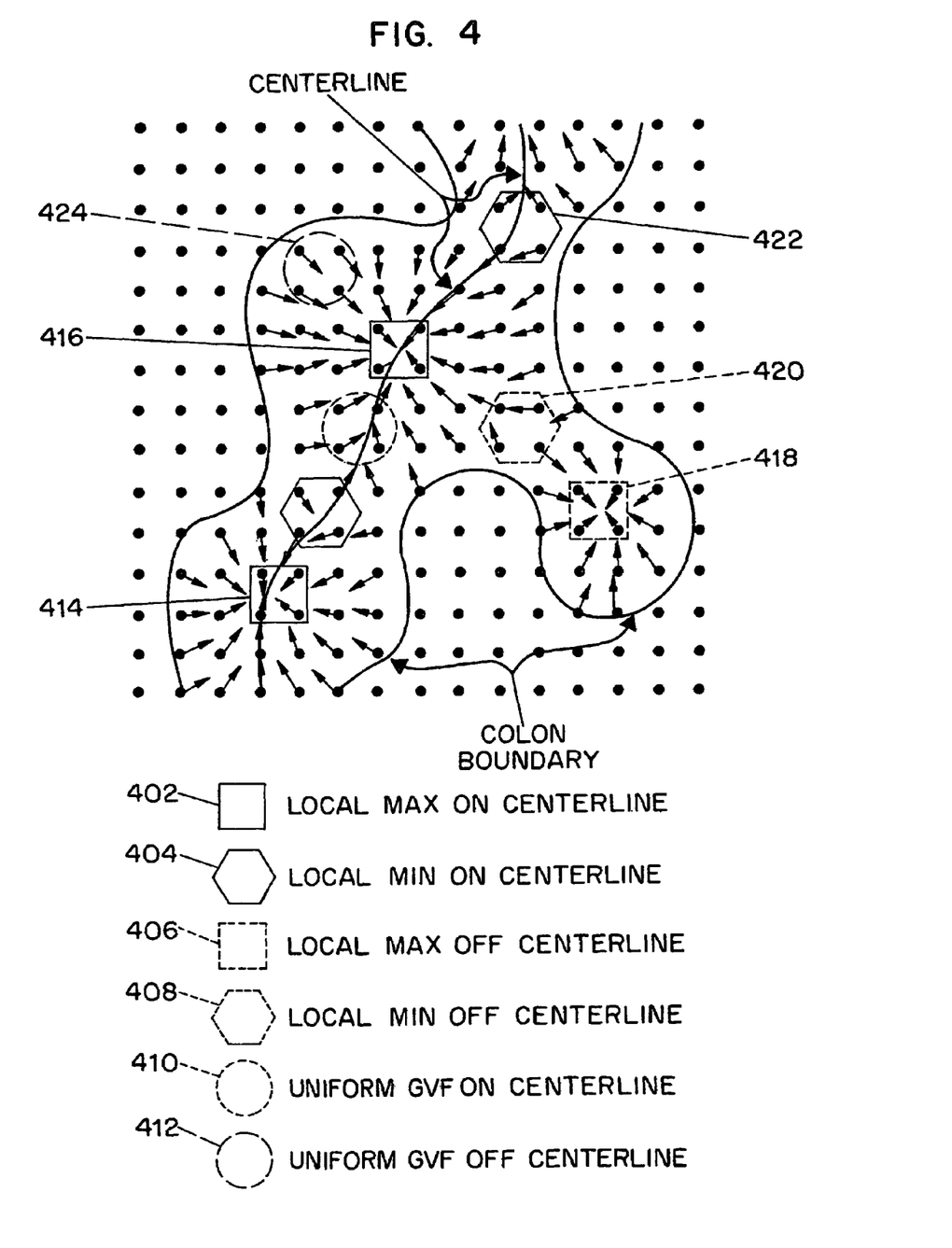
FIG. 4 is a graphical representation illustrating the flagging of nonuniform gradient neighborhoods from the diagram of FIG. 3.

After the GVF is established, the gradient vector field is analyzed to determine the characteristics of local neighborhoods within the gradient field vectors. The neighborhoods can be defined as 2×2×2 voxel cells. Referring to FIG. 4, the neighborhoods can be characterized in six classes: local maxima near the centerline 402, local minima near the centerline 404, uniform areas near the centerline 410, uniform areas off the centerline 412, local maxima off the centerline 406 and local minima off the centerline 408.

Local maxima on or near the centerline 402 are defined as those regions near the centerline of the object in which all of the gradient vector field vectors of the 8 voxel neighborhood point in a direction towards the centerline. Thus, as illustrated by local maxima 414 and 416, all of the gradient vector field vectors are pointing in a different, but converging direction.

A local minima on the centerline 404 is defined as a neighborhood where all of the gradient vector field vectors surrounding such a minima are directed away from this point and towards a neighboring maxima. The vectors will then be in at least two groups of vectors pointing in opposite directions. In the case of a centerline through a lumen, each minima is bounded by a maxima on either side.

A local maxima located off of the centerline 406 generally has the same characteristics as a local maxima which is located on or near the centerline 402. The only difference being that such a local maxima is positioned remote from the centerline. This can occur in branches or distortions in the object off of the main centerline, such as illustrated by local maxima 418. Similarly, local minima off the centerline, such as local minima 420 are indistinguishable from local minima on the centerline, such as local minima 422, except for their position with respect to the centerline.

In addition to local maximas and local minimas there are also regions of uniform gradient vector field vectors, both on the centerline 410 and off the centerline 424. A uniform GVF is defined as one where the GVF vectors of the neighborhood, such as an eight voxel cell, have a direction which varies less than ninety degrees from the average direction. In those regions which are near the object boundary, the vectors in a local neighborhood generally point in the same direction which is perpendicular to the boundary. There can also be regions along the centerline where the object widens quickly. As a result, the GVF vectors neighboring the centerline in such regions will tend to point uniformly towards the center of this region. Thus, the method of labeling all nonuniform gradient vector field regions does not capture this portion of the centerline.

Figure 5:
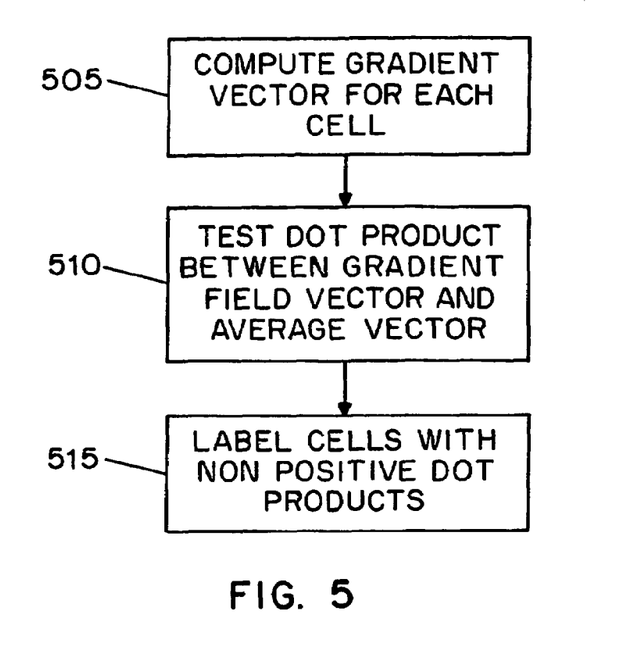
FIG. 5 is a flow chart illustrating a method for labeling nonuniform gradient vector field vectors.

Given that a uniform GVF is defined as one where the GVF vectors of the neighborhood, such as an eight voxel cube or cell, have a direction which varies less than ninety degrees from the average direction, the process set forth in FIG. 5 can be used to label local uniform and nonuniform GVF vectors. In step 505 the normalized average gradient field vector is computed for each defined neighborhood, such as 2×2×2 cells of voxels, for each voxel position. Next, the dot-product between each of the 2×2×2 GVF vectors and the associated average vector is determined and tested. (step 510). A positive dot product indicates a uniform GVF, whereas a zero or negative dot-product is indicative of a nonuniform GVF. Thus, to identify the nonuniform neighborhoods, those cells having a nonpositive dot product are labeled. (Step 515).

The use of a small number of voxels, i.e., 8, in each voxel position neighborhood allows for rapid execution time and results in the flagging of only a small percentage of voxels inside the boundary as being potentially near the centerline.

Figure 6:
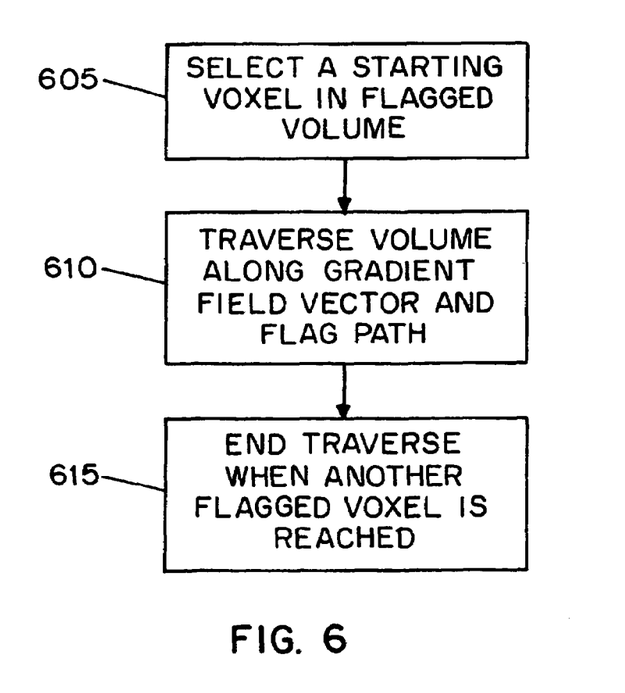
FIG. 6 is a flow chart for connecting flagged voxels of a centerline.
Figure 7:
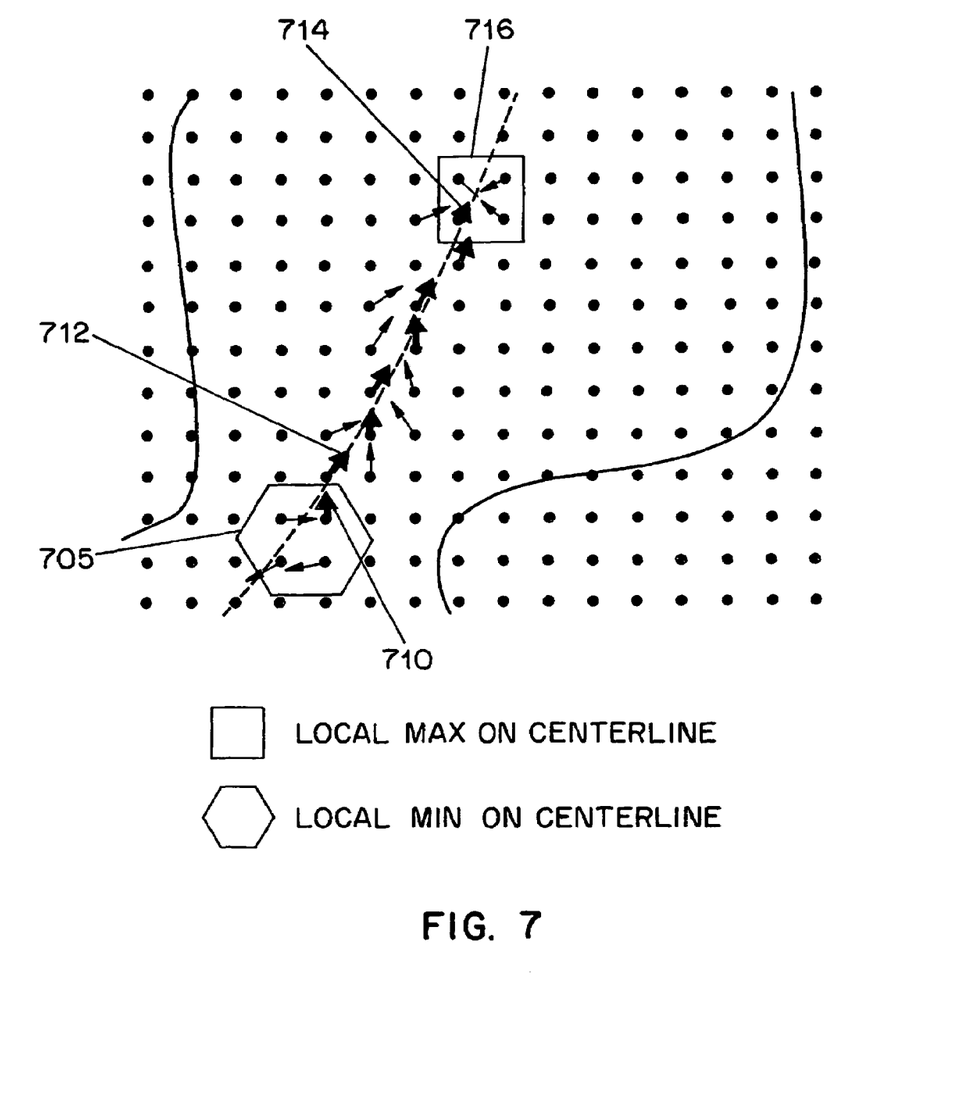
FIG. 7 is a graphical representation illustrating the connection of flagged voxels along the gradient vector field vectors.

The result of the flagging process is a number of disconnected groups of flagged voxels. The next step is to connect the flagged voxels along the centerline (FIG. 1, Step 110). An overview of a procedure for connecting the flagged voxels of the nonuniform GVF's is illustrated in FIGS. 6 and 7. First, a flagged voxel position, such as local minima 705, is selected as a starting point. (Step 605). Each vector of the flagged voxels has a component which points along the centerline and a component which points towards the centerline. Thus, a voxel by voxel path is traversed from the first flagged voxel, along the direction of the GVF vector (step 610), until a next flagged voxel is reached (step 615). Referring to FIG. 7, beginning with flagged voxel 710, the GVF vector is directed to voxel 712. This process is repeated until flagged voxel 714 of local maxima 716 is reached. Because the GVF vectors tend to point towards the centerline, the process of traversing along the voxels is a self correcting process. For example, voxel 710 is to the right of the centerline and the next voxel selected 712 is to the left of the centerline. Because the GVF vector of 712 is directed towards the centerline, the next voxel selected will at least be closer to the centerline or, perhaps, to the right of the centerline. The process of steps 605 through 615 is repeated for each group of flagged nonuniform neighborhoods.

Returning to FIG. 1, a starting point voxel within the object is selected and the farthest voxel(s) from that voxel are determined by calculating the distance from the source field (DSF) (step 114). Such farthest voxels from any arbitrary voxel will represent the endpoints of the centerline and can be selected as a root voxel for the centerline or skeleton. The choice of starting point voxel can be improved by domain knowledge. In the case of colonoscopy, the rectum is the optimum point to start the examination, so we wish to select a point near the rectum. An estimation of the location of this point can be determined by finding the nearest "inside" point closest to the center-bottom of the dataset. This can be found by executing a search through the voxels near the center-bottom dataset voxel in shells of increasing radii until a voxel determined to be "inside" the colon is found.

In step 116, the penalized distance from the root voxel field (PDRF) is determined. Calculating the PDRF involves assigning a penalty to each voxel in the proposed path. The penalty, p at a voxel v is assigned based on the DBF value at that voxel calculated in step 106 as well as a global upper bound of all DBF values, M (M>max(DBF)). The penalty, p can be calculated as:

$$p(v)=5000 \cdot [1-DBF(v)/M]^{16}$$

The term $[1-DBF(v)/M]$ is always in the range of $[0, 1]$ with the maximal values occurring for voxels near the boundary of the object. The term 5000, which is chosen heuristically, is selected to be sufficiently large to ensure that the resulting penalty is sufficiently large to overcome any distance advantages of a straight path. The value of 5000 allows skeleton segments to be up to 3000 voxels long without exceeding floating point precision. Other functions with similar characteristics can be chosen (e.g., small penalty towards the center and large at the boundary).

After assigning the penalty to each of the flagged voxels, the minimum cost path can be determined. (Step 118). The accumulated cost at each voxel along a path can be expressed as:

$$cost(v_k)=cost(v_{k-1})+distance(v_k, v_{k-1})+penalty(v_k)$$

In addition the accumulated cost, the accumulated distance at a given voxel, $D_a(v)$, can be expressed as:

$$D_a(v_k)=D_a(v_{k-1})+distance(v_k, v_{k-1})$$

This accumulated distance can be used to identify the farthest voxel in the PDRF, which represents the opposite end of the centerline.

From the farthest voxel, the minimum cost path back to the source voxel is determined. This is performed, in a similar manner to the Dijkstra algorithm, by tracing the discrete centerline from the end voxel back to the root voxel. Because of the inclusion of higher penalties for voxels near the boundary, the minimum cost path tends to be pushed into the center of the object. This minimum cost path is the discrete centerline of the object. In the case of a tree like structure, this discrete centerline is the main branch of the discrete skeleton tree.

The discrete centerline is made up of numerous connected short straight line segments from voxel to voxel. Such a discrete "stair step" representation is not the most desirable centerline in many applications, such as virtual navigation. In such a case, the stair step can manifest itself as jitter in the virtual camera. Therefore, in many cases it is desirable to smooth the discrete centerline. (Step 120). One preferred method of smoothing the curve is to use an approximating spline algorithm with adaptive error tolerance. In narrow regions of the object, the error value should be small whereas in wider regions, more divergence from the discrete centerline can be tolerated. This error tolerance can be expressed as a percentage of the distance from the boundary. A percentage of less than 50% insures that the centerline remains closer to the centerline than to the boundary, thus it is guaranteed to be within the boundary. A well known B-spline curve which interpolates the first and last voxel and approximates the ones in between can be used with control points placed close to centerline voxels at nonuniform intervals. A number of heuristics can be used to minimize the number of control points required to acheive a particular accuracy. For example, an error tolerance of 35% may require 17% of the discrete centerline voxels as control points whereas an error tolerance of 50% would only require 13% of the discrete centerline voxels as control points.

In the case of a lumen-shaped object, such as a colon, where only a single centerline is desired, the smoothing operation would complete the centerline generation process. In the case of more complex, branched structures such as the lungs and aorta this initial centerline will serve as the main branch in the complete tree structure skeleton of the object.

The determination of the rest of the branches of the skeleton for a complex object are determined in steps 122 through 130 which are repeated for each branch of the skeleton.

The process of extending the centerline to a complete skeleton definition starts with the concept of "rolling an adaptive sphere" down the skeleton voxels. This, as explained below, will result in the labeling of those voxels which are near the centerline of the branches in the skeleton. (Step 130). The adaptive sphere is defined at each voxel along the skeleton in terms of its proximity to a boundary, a user applied scaling factor and a user defined constant. This is expressed mathematically as:

$$radius(v)=DistanceFromBoundary(v) \cdot scale+constant$$

Those voxels within the radius of the adaptive sphere are labeled as processed voxels. The combination of the terms scale and const determine the minimum feature size that will be used to determine a skeleton branch. For example, in a lumenal structure, such as the colon, a scale value of scale=3 and const=50 results in the initial centerline labeling all colon voxels and thus remains the only centerline through the object. For branched objects, such as the aorta, the values scale=1.1 and const=10 have been found to result in the identification of all significant vessels as branches of the skeleton.

To identify a branch along the centerline, a new penalized distance from root field (PDRF) is calculated for each of the voxels labeled as processed voxels in step 122. (Step 124). The PDRF is performed in a similar fashion as described above in connection with step 116. The voxel identified as the farthest voxel from the PDRF calculation is used as the tip of the next major branch.

From the tip voxel of the current branch, a path is determined along the PDRF for the current branch until an existing skeleton voxel is reached, i.e. the branches merge. (Step 126).

As set forth above with respect to step 118, this involves identifying the minimum cost path through the PDRF of the branch voxels.

After the discrete minimum cost path is determined for the current branch, the branch centerline can be smoothed. (Step 128). The smoothing operation can be performed using the process described in connection with step 120 or any number of other curve smoothing techniques which are known. The one additional constraint that should be applied is that the smoothing operation should not result in a discontinuity at the point where two branches of the skeleton merge.

After the centerline for the branch is smoothed, those voxels of the branch centerline are added to the dataset of skeleton branches. (Step 130). Steps 122-130 are repeated until the entire segmented volume of the object of interest has been analyzed.

Figure 9A:
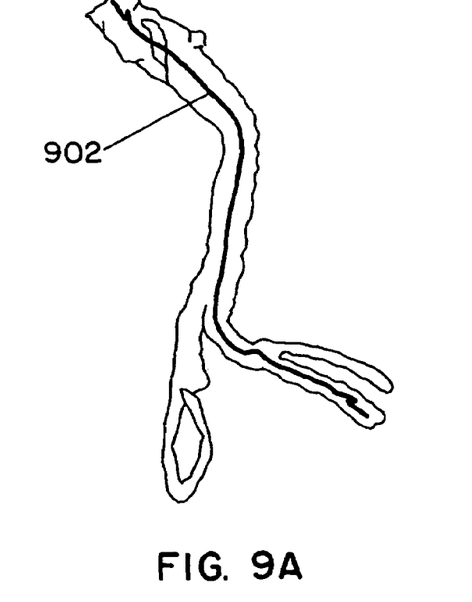
FIG. 9a illustrates the generation of a centerline through an aorta.
Figure 9B:
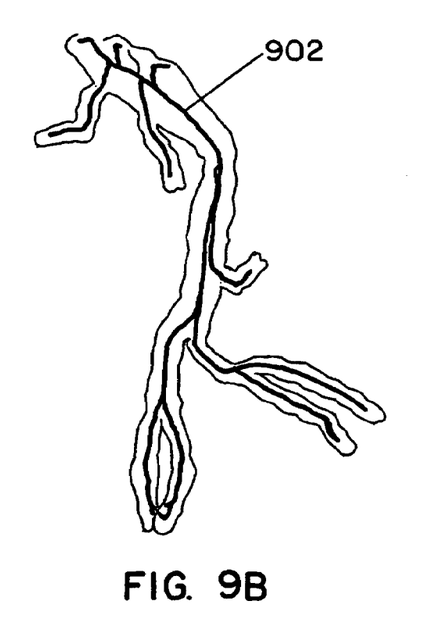
FIG. 9b illustrates the generation of a complete tree skeleton through an aorta, in accordance with the method of FIG. 1.

FIG. 9A illustrates the results performing steps 102 through 120 on a set of image data of an aorta. The aorta is rendered substantially transparent and the centerline 902 of the major branch of the aorta is highlighted. In FIG. 9B, steps 120 through 130 have been iteratively repeated to extend centerline 902 into a full tree skeleton of the aorta in which all branch vessels have a centerline therethrough.

A further, optional method to improve the determination of both endpoints for any segment can be employed. The method is to compute the PDF from the approximate start point and find the maximum distance point from the approximate start point. The maximum distance point is then considered the true end point. Another PDF is computed from the true end point and the maximum distance point is then considered the true start point.

There may be more than one connected component (or segment) automatically identified as part of the colon. Some or all of these segments may actually be part of the colon. If more than two segments exists, the second segment may be selected by finding the nearest new segment voxel to the end of the first segment centerline. This point can be used as the starting point for the new PDRF in the new segment.

When two or more segments have been automatically identified by the system and the viewer disagrees with the assigned order, the user can be given the opportunity to select some or all of the segments (because some may be pockets of air in other organs not of interest). The selection can be made by clicking on each segment in the desired order of traversal. For example, in colonoscopy, the doctor usually clicks on the segment with the rectum first and the segment with the cecum last. Furthermore the user is able to reverse the preferred direction of travel within each segment so that the connection of all centerlines appears to be one continuous path. Furthermore, the selection of segments in order and the selection of directions within each segment can be accomplished by a single selection at one segment end or the other. The system can automatically determine which end the user selected and reverse the centerline direction if necessary.

In order to facilitate guided navigation throughout a skeleton, a user can define a start point and an endpoint for the navigation by selecting these points on the skeleton using a graphical user interface. If the start or end points are near the endpoints of the centerline or branch, selection need not be precise as the selected point can be snapped to the endpoint of the branch tips. If desired, new navigation fields can be calculated for this newly defined path and a new centerline can be generated between the selected points to reduce any transistion at branch junctions.

After a centerline of skeleton is determined through a virtual object, such a centerline is often used as a primary path for navigating through the object. As noted above, the user is generally provided with the opportunity to navigate in both directions along the centerline and can also navigate off of the centerline to explore regions of interest. However, with this flexibility in navigation comes the opportunity for the user to become disoriented.

Figure 10:
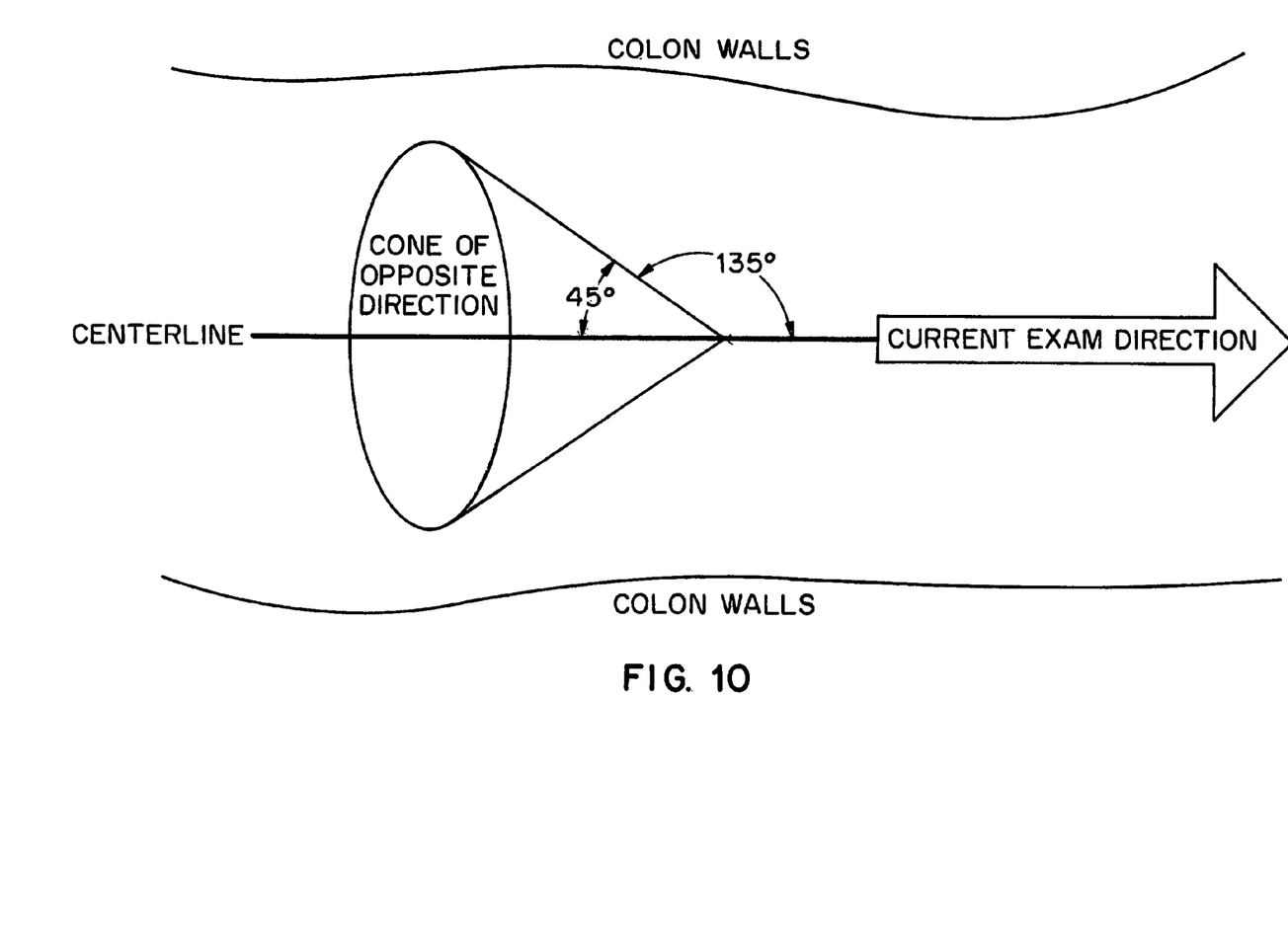
FIG. 10 is a cross section of a region of interest with a centerline and parameters for establishing the direction of travel along the centerline.

To minimize the opportunity for disorientation while navigating in an interactive mode, the present method can employ a technique to color the centerline to indicate the direction of travel and to mark areas which have already been explored. The centerline is colored according to whether the user is traveling along the same direction as the current examination direction (i.e., rectum→cecum or cecum→rectum). As illustrated in FIG. 10, the normal color (such as green signifies that the viewpoint is within 135 degrees of the closest centerline direction. The opposite color (such as red) signifies that the viewpoint has come within 45 degrees of the opposite-direction of the closest centerline direction. The determination of this coloring is preferably filtered by a predetermined threshold value to add a level of hysterisis so that the centerline does not flash between the two colors (FIG. 1). The angle between the current view direction and the closest centerline direction is simply computed as the arccos of the dot product of the two directions. To be able to easily determine the closest centerline position during navigation, all valid positions for the virtual viewpoint store a pointer to the closest centerline point which is preferably defined by discrete points rather than as a continuous representation for quick lookup.

The PDF has another important use other than the creation of a centerline. The PDF can be used to translate the viewpoint of the user through each segment toward each segment centerline endpoint. The PDF field has the property that at every point the gradient simultaneously points away from the boundary and towards the segment centerline endpoint. By simply translating the viewpoint along the gradient direction until the viewpoint reaches the global minimum value, the viewpoint is smoothly drawn towards and along the centerline. This makes it easy for the user to efficiently traverse the colon without getting lost. Furthermore, the view direction can be rotated toward the direction of travel so that the user is looking where he is going. To smooth the transition from the current view direction to the new travel view direction, the view direction is combined with the new travel view direction with a weighted vector addition at each time step. Besides automatic navigation, the user can be permitted to freely navigate within the boundary of the object away from the centerline. The value of the DFB provides a measure of the virtual camera's proximity to the object boundary. If the viewpoint is within some threshold distance from the boundary, then a force can be activated which smoothly pushes the viewpoint "away from" the boundary. The "away from" direction can be estimated by using the gradient of the DFB. This gradient yields the most likely direction which points away from the boundary. The magnitude of the force can be determined by a function which is greatest closest to the boundary and decreases away from the boundary.

The cost field computation which employs penalties which are proportional to the proximity to the boundary of an object discussed above with respect to centerline generation can also be used in guided navigation through an object. Thus, the cost of a chosen navigation path can be the accumulated Euclidean distance of the chosen path plus the accumulated penalty cost of the path. Regardless of the starting point for a guided navigation, the penalty fields will tend to push the navigation towards the centerline and then direct the navigation smoothly down the centerline towards the selected seed point, which is typically chosen as an end point of the object.

The present methods can be performed on any number of computer processing platforms. It is expected that the increased efficiency that is provided by these techniques make them well suited for use on personal computer systems. For example, an IBM compatible Wintel PC operating under the Windows2000 operating system and having a single 1 GHZ CPU resulted in very reasonable processing times, such as generating a colon centerline less than two minutes, and the aorta skeleton of FIG. 9B in 36 seconds.

Although the present invention has been described in connection with specific exemplary embodiments, it should be understood that various changes, substitutions and alterations can be made to the disclosed embodiments without departing from the spirit and scope of the invention as set forth in the appended claims.

The invention claimed is:

1. A computer-based method for determining a centerline through a region of interest in a 3D image dataset comprising:
    identifying the boundaries of the region of interest in the 3D image dataset;
    identifying the endpoints of the region of interest;
    determining a gradient field for each point in the region of interest;
    identifying regions of points in the region of interest where the gradient field exhibits a non-uniform gradient; and
    connecting the regions having a non-uniform gradient to identify a plurality of points proximate to the centerline of the region of interest;
    for those plurality of points proximate to the centerline, determining a penalty value which is a function of proximity of the point to a boundary; and
    determining a path connecting the endpoints which has the minimum penalized distance wherein the penalized distance reflects the actual accumulated pathlength and the penalty values associated with the points along the path.

2. The method of claim 1, further comprising smoothing the path connecting the endpoints.

3. The method of claim 1, wherein at least one of the endpoints is selected based on prior knowledge of the object.

4. The method of claim 1, further comprising:
    identifying the endpoints of branches from the centerline;
    for each identified endpoint, determining a branch path connecting the endpoint to another branch which has the minimum penalized distance wherein the penalized distance reflects the actual accumulated pathlength and the penalties associated with the points along the branch path.

5. The method of claim 4, further comprising computing a distance from boundary field for each of the points in the branch paths.

6. The method of claim 4, further comprising, for each branch, identifying points which are near the centerline of the branch and performing the steps of determining a penalty value and determining a path only on the points near the centerline.

7. The method of claim 6, wherein the operation of identifying point near the centerline of the branch further comprises:
    determining a gradient field for each point in the region of interest;
    identifying regions of points having a non-uniform gradient; and
    connecting the regions having a non-uniform gradient.

8. The method of claim 7, further comprising smoothing the centerline of each branch.

9. A method of generating a centerline through a virtual object comprising:
    acquiring a 3D image dataset of the virtual object, the image dataset comprising a plurality of voxels;
    identifying the boundaries of a region of interest in the 3D image dataset;
    computing a distance from boundary field for each of the voxels in the region of interest;
    determining a gradient voxel field for each voxel in the region of interest;
    identifying regions of voxels having a non-uniform gradient;
    connecting the regions of non-uniform gradient;
    from the connected regions, identify a root voxel;
    for the connected voxels, calculate a penalized distance from the root voxel; and
    determine the minimum penalized distance from the root voxel to the farthest voxel from the root voxel.

10. The method of claim 9, further comprising smoothing the path defined by the minimum penalized distance.

11. The method of claim 9, further comprising:
    determining the endpoints of branches;
    for each branch endpoint, determining a branch path connecting the endpoint to another branch which has the minimum penalized distance wherein the penalized distance reflects the actual accumulated pathlength and the penalties associated with the points along the branch path.

* * * * *